United States Patent [19]

Okajima

[11] Patent Number: 4,582,350
[45] Date of Patent: Apr. 15, 1986

[54] HELICALLY THREADED MECHANISM

[75] Inventor: Hidekazu Okajima, Kanagawa, Japan

[73] Assignee: Canon Kabushiki Kaisha, Tokyo, Japan

[21] Appl. No.: 659,338

[22] Filed: Oct. 10, 1984

[30] Foreign Application Priority Data

Oct. 13, 1983 [JP] Japan .................. 58-158537
Dec. 20, 1983 [JP] Japan .................. 58-194963

[51] Int. Cl.$^4$ ............................. F16L 15/00
[52] U.S. Cl. ................... 285/390; 285/391; 285/39; 285/423; 350/429
[58] Field of Search ............... 350/429, 255; 285/390, 285/391, 34, 35

[56] References Cited

U.S. PATENT DOCUMENTS

| | | | |
|---|---|---|---|
| 1,130,497 | 3/1915 | Dunham | 285/391 |
| 2,822,418 | 2/1958 | Dinnick | 285/390 |
| 3,380,761 | 4/1968 | Van Devender, Jr. | 285/34 |
| 3,442,536 | 5/1969 | Fowler | 285/391 |
| 3,540,762 | 11/1970 | Dunlap | 285/391 |
| 3,948,545 | 4/1976 | Bonds | 285/391 |

FOREIGN PATENT DOCUMENTS 55-120007  9/1980  Japan .
 56-9710   1/1981  Japan .

Primary Examiner—John K. Corbin
Assistant Examiner—Lotta Ben
Attorney, Agent, or Firm—Toren, McGeady, Stanger, Goldberg & Kiel

[57] ABSTRACT

A helicoid thread mechanism which comprises a male helically threaded tube and a female helically threaded tube is provided with a helically threaded block for threadedly engaging the female tube onto the male tube. A sliding frictional contact noise which is produced between the two tube members when they engage with each other is eliminated by suitable selection on the helically threaded shape and the material of the block.

4 Claims, 6 Drawing Figures

HELICALLY THREADED MECHANISM

BACKGROUND OF THE INVENTION

1. Field of the Invention

This invention relates to a helicoid mechanism of a lens barrel for an optical apparatus such as a single-lens reflex camera or a video television camera (VTR) and more particularly to a helicoid threaded mechanism which consists of male and female helically threaded tubes and satisfies a requirement for high engagement precision and smooth rotation without producing any noise during the sliding engagement of these tube members.

2. Description of the Prior Art

Heretofore, the above-stated male and female helically threaded tube members have been made of a metal material such as aluminum in general. Recently, however, plastic materials have come to be employed in place of the metal material as a result of efforts to reduce the weight and cost of the lens barrel. However, compared with the aluminum material available these days, the plastic materials is somewhat inferior in terms of strength and precision. In view of this, it is now the practice to make the plastic material equivalent to the metal material by using glass fiber or the like in combination with a plastic material. In that instance, however, the glass fiber which is mixed in the plastic material inevitably comes to surface. The tube members which are made of such a material either produce a sliding friction noise between their threaded coupled surfaces or produce there a play resulting from mutual abrasion.

To absorb the play thus produced at the threaded engagement part, it has been contrived to insert an elastic member into the helicoid barrel part in a manner, for example, as disclosed in Japanese Laid-Open Patent Application No. SHO 55-120007. However, in cases where the length of the threaded fitting engagement is short or where the threaded mechanism is required to have a fine lead, the above-stated method of inserting an elastic member fails to meet the required precision. Particularly, the problem of the sliding friction noise produced during the threading rotation still remains unsolved.

In another known method for eliminating the play in engagement and the sliding friction noise of a threaded mechanism, a portion of the threaded part is arranged to differ in the pitch of screw thread or lead from that of other portions as disclosed, for example, in Japanese Laid-Open Patent Application No. SHO 56-9710. However, this arrangement to partly vary the screw thread or lead presents problems such as a difficulty in the manufacture of the threaded tubes.

SUMMARY OF THE INVENTION

It is an object of this invention to provide a helicoid mechanism of a lens barrel for an optical apparatus such as a single-lens reflex camera or a video television camera (VTR) which is capable of meeting a requirement for high engagement precision and smooth rotation without any noise during sliding engagement between male and female helically threaded tube members.

It is another object of the invention to provide a lens barrel which solves the problems of the prior art mentioned in the foregoing by forming a non-threaded engagement part in the threaded engagement parts of male and female tube members of the lens barrel.

It is a further object of the invention to provide a helically threaded mechanism wherein helically threaded block pieces are arranged on and carried by the outer circumference of a male tube as a threaded engagement part of the male tube; the threaded parts of these block pieces are arranged to be in threaded engagement with the helicoid part of a female tube; and the above-stated sliding frictional contact noise is reduced or substantially eliminated by arranging a tooth profile of the threaded part of the male tube to be shorter than that of the threaded part of the female tube or that of the threaded parts of the block pieces and also by having the above-stated block pieces made of a material having a smaller coefficient of friction than that of the material of the female tube.

These and further objects and features of the invention will become apparent from the following detailed description of preferred embodiments thereof taken in conjunction with the accompanying drawings.

BRIEF DESCRIPTION OF THE DRAWINGS

An embodiment of this invention is arranged as shown in FIGS. 1, 2 and 3.

Figure 4:
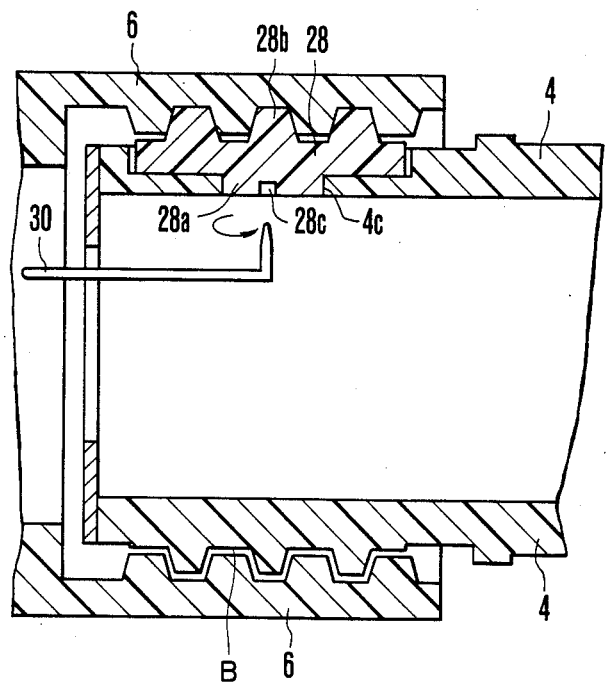
Figure 5A:
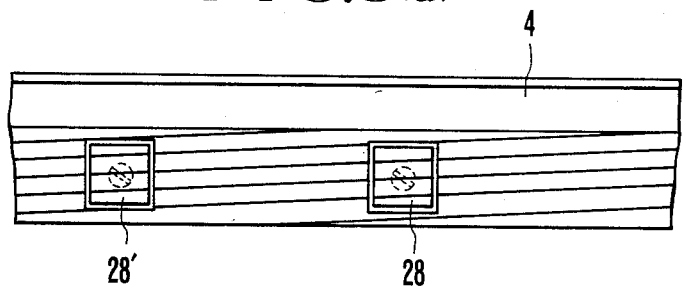
Figure 5B:
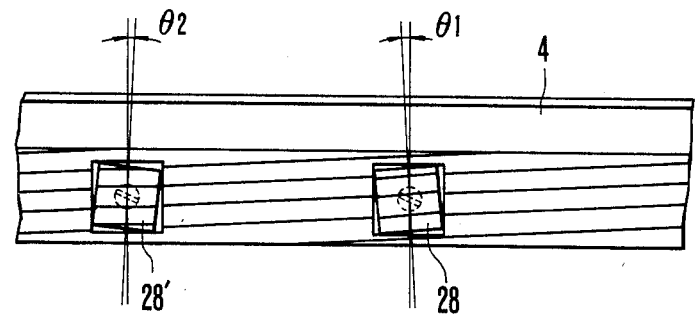

A second embodiment of this invention is arranged as shown in FIGS. 4, 5(a) and 5(b), FIG. 4 being a sectional view showing a method for adjusting a helically threaded block 28 employed in the second embodiment and FIGS. 5(a) and 5(b) respectively illustrating the conditions of the threaded engagement.

DETAILED DESCRIPTION OF THE PREFERRED EMBODIMENTS

Figure 1:
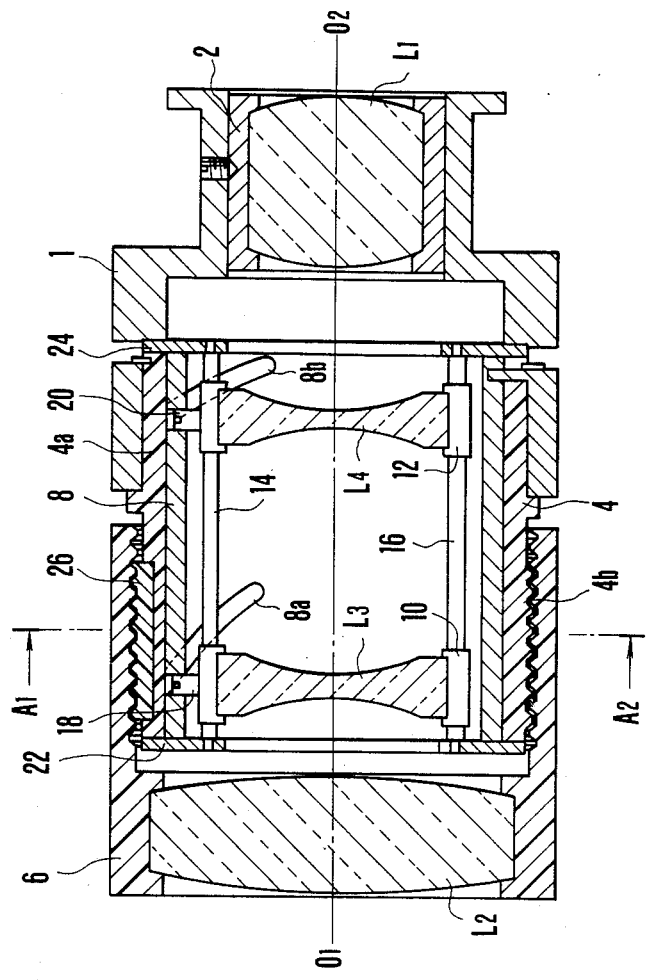
FIG. 1 being an axial section view showing a lens barrel.

Referring to FIG. 1 which shows an embodiment of the invention, the embodiment includes a fixed tube 1 which either has a bayonet member disposed at the fore end thereof for mounting the whole of a lens barrel assembly on a camera (not shown) or is secured to a video camera or the like in one unified body therewith. A lens carrying frame 2 which carries a relay lens L1 is secured to the inner side of a fixed tube 1. A male helically threaded tube 4 is fitted in and secured to the inner side of the fixed tube 1. A distance adjustment ring 6 which is arranged to carry a focusing lens L2 within it is provided with a female helically threaded part which is in threaded engagement with the male tube 4. A cam tube 8 is fittingly inserted in the inner side of the male tube 4. Lens carrying frames 10 and 12 are arranged to carry a power varying or variator lens L3 and a compensator lens L4 respectively. Guide rods 14 and 16 are arranged to carry these lenses L3 and L4 to have them linearly shiftable in the direction of an optical axis. Engaging pins 18 and 20 which are provided on the lens carrying frames 10 and 12 are respectively arranged to engage cam slots 8a and 8b formed in the inner circumferential face of the cam tube 8. Fixed plates 22 and 24 are arranged to carry the guide rods 14 and 16 to have them in parallel with the optical axis. These fixed plates 22 and 24 are secured to the male tube 4.

Figure 2:
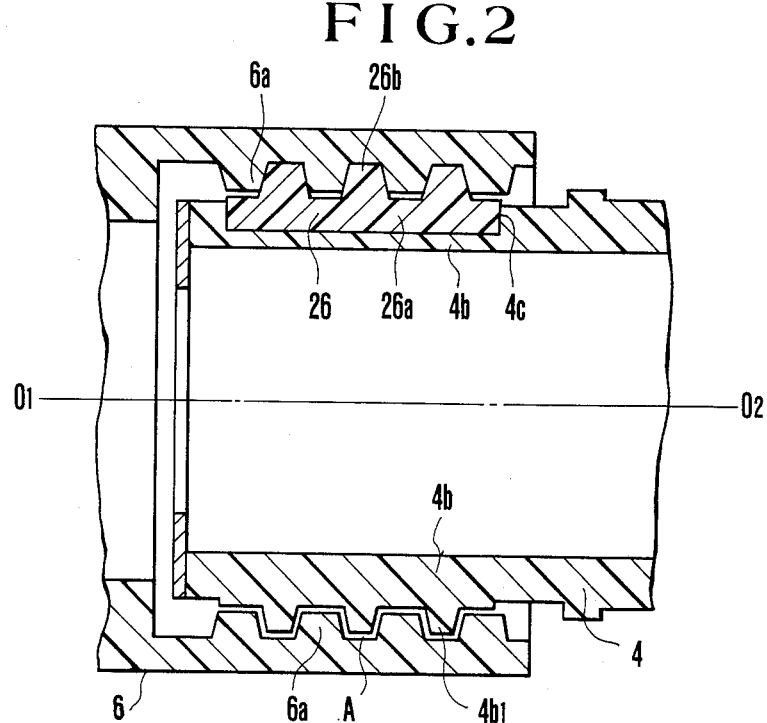
FIG. 2 being a sectional view showing the threaded engagement of block pieces 26 and FIG. 3 being a sectional view taken on line A1–A2 of FIG. 1.

In the lens barrel assembly arranged as described above, the male and female tubes jointly form a threaded mechanism. The further details of the threaded mechanism according to the invention are as described below with reference to FIGS. 2 and 3 in addition to FIG. 1:

The front part of the female tube 6 is arranged as a lens carrying part to carry the focusing lens L2. In the drawing, a lens carrying frame of this part is omitted from the illustration and is shown as in one unified body with the front part. However, the lens carrying part is arranged in a known manner employed in general. A female helically threaded part 6a is arranged on the rear inner circumferential face of the female tube 6. The female tube 6 is made of a poly-carbonate resin material containing about 10% of glass fiber. The male tube 4 has its rear part 4a formed into a coupling part for coupling it with the above-stated fixed tube 1. The outer circumferential face of the male tube 4 is formed into a helically threaded part 4b. However, as shown in FIG. 2, a tooth profile 4b1 of the threaded part 4b is arranged to be shorter than a tooth profile of the female helically threaded part 6a to have a clearance A in the helicoidal coupling part between the female tube 6 and the threaded part 4b of the male tube 4.

Figure 3:
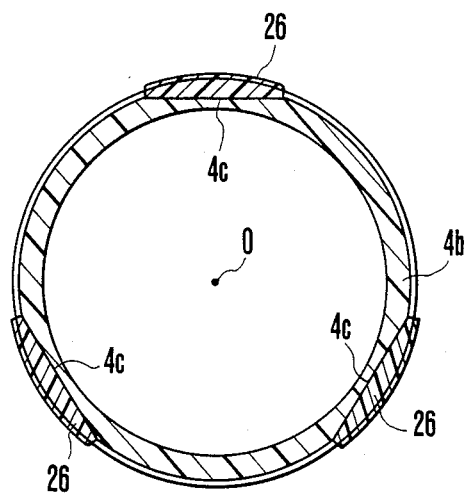

Further, a plurality of or, say, three recesses or openings are formed in the outer circumferential face of the threaded part of the male helicoid tube 4 and are arranged to serve as stowing or receiving parts 4c. Then, threaded block pieces 26 are inserted with pressure into these stowing parts 4c in a manner as shown in FIG. 2. Each of the block pieces 26 consists of a base parts 26a which is pressure inserted into the receiving part 4c and a threaded engagement part 26b which is arranged to be in threaded engagement with the threaded part 6a of the female tube 6. The block pieces 26 are made of some material that has a smaller coefficient of friction than the material of the female tube 6. For example, each of these block pieces 26 is made of a poly-acetal resin material containing molybdenum disulfide. FIG. 3 is a sectional view taken on a line A1–A2 shown in FIG. 1. As shown, the receiving or stowing parts 4c are approximately evenly spaced along the outer threaded circumference of the male tube 4 and have the block pieces 26 pressure inserted and secured thereto.

With the lens barrel arranged as described above, a lubricant oil is injected in between the threaded parts 4b and 6a of the male and female tubes 4 and 6. Then, the lubricant oil enters clearances between the crests and roots or rising and falling parts of threads accordingly as the female tube 6 is rotated. The lubricant oil thus smoothens the relative rotation of these tubes. The threaded engagement between these tubes 4 and 6 is effected by the block pieces 26 buried in the male tube 4 and the threaded part 6a of the female tube 6. Meanwhile, the rest of the threaded part 4b of the male tube 4 has lower crests of thread and comes to have more lubricant oil there according as rotation proceeds. A predetermined quantity of lubricant oil which has been thus accumulated in one part comes to be fed to a next threaded engagement part of each of the block pieces 26 to smoothen the rotation of the threaded engagement part.

In this embodiment, the sliding friction noise produced during threaded rotation between component members can be reduced to a great extent by virtue of the threaded mechanism described above in conjunction with the selected combination of materials for these members.

FIGS. 4, 5(a) and 5(b) show a second embodiment. In these drawings, the same parts as those used in the first emodiment are indicated by the same reference numerals. In this case, the plurality of holes 4c are arranged in different points along the outer circumference of the male tube 4 to have block pieces 28 fitted therein. Each of these block pieces 28 consists of a boss part 28a which is fitted into one of the above-stated holes 4c and a threaded part 28b which engages the threaded part of the female tube 6. An adjustment tool 30 is arranged to be inserted through the openings of the tubes 4 and 6.

The threaded coupling part of this embodiment is adjustable by the following adjustment operation: FIGS. 5(a) and 5(b) are development views showing a part of the male tube 4. As shown in FIG. 5(a), the block pieces 28, 28', . . . are set at a helically threaded part of the male tube 4 in a state prior to adjustment in such a manner that the threads of these block pieces 28, 28', . . . coincide with the threads of the outer circumference of the male tube 4. Then, the female tube 6 is coupled with the outer circumference of the male tube 4 which is arranged in the above-stated manner. Under this coupling condition, the adjustment tool 30 is engaged with a minus-sign shaped groove 28c provided in the boss part 28a. The tool 30 is then turned to remove any play existing in the threaded coupling. Referring to FIG. 5(b), the tool 30 is turned, for example, in such a manner that, while one block piece 28 is shifted by the tool 30 counterclockwise to a degree $\theta 1$, another block piece 28' is shifted clockwise to a degree $\theta 2$. With the adjustment carried out in this manner, the pieces 28, 28', . . . can be adjusted to coincide with the lead of the helicoidal thread of the female tube 6. Besides, even a delicate play such as a play due to tooth profile precision, etc. can be removed by this adjustment. After completion of adjustment, the block pieces 28, 28', . . . are fixed in their adjusted positions by injecting an adhesive into the hole parts 4c and the boss parts 28a respectively. With the embodiment arranged in this manner, if the male tube 4 is formed by a poly-carbonate resin material containing glass fiber or the like that excels in strength and precision of forming dimensions, for example, these block pieces 28, 28', . . . can be made from a material which is of a low coefficient of friction and advantageous against abrasion, such as poly-acetal resin, ethylene fluoride resin, etc. Further, the helically threaded part of the male tube 4 is continuously arranged at the same pitch as that of the helicoid thread of the block pieces 28, 28', . . . Therefore, the lubricant oil applied to the helically threaded part serves as oil reservoir to supply lubricant oil to the threaded coupling part according as the lens barrel rotates. The helically threaded part serves also as a force bearing part in the event that the force of an overload is exerted on the female thread of the female tube 6. In the embodiment described, the male tube 4 is provided with the block pieces 28 which are arranged to be adjustable by turning them around. However, instead of this arrangement, female block pieces may be arranged on the female tube 6 to be adjustable by turning them around. Further, it is possible to lower the sliding friction noise by arranging the height of the crests of the helicoidal thread of the male tube 4 to be lower than that of the block pieces 28 in such a way as to have a clearance B as shown in FIG. 4.

In the helicoid thread mechanism of the lens barrel according to the invention, one of the threaded engagement parts, i.e. the male and female tubes, is arranged to have a threaded part which has a tooth profile shorter than that of the other and which is not in threaded engagement with the other. This non-engaging part serves to gradually move a lubricant oil forward according as the lens barrel rotates. By virtue of this non-engaging part, the lens barrel is smoothly rotatable without producing the sliding friction noise mentioned in the foregoing. In forming this non-engaging part, a tooth profile of the threaded part 4b of the male tube 4 is arranged to be shorter than that of the threaded part 6a of the female tube 6; and the above-stated threaded block pieces 26 are buried in the male tube 4 to have a threaded coupling effected by the block pieces 26 and the female tube 6. This arrangement permits simplification of the threaded mechanism.

Further, in accordance with the invention, the threaded part of either the male or female tube is partially divided. The divided parts thus obtained are arranged to be adjustable in the lead direction thereof by turning them around. This arrangement permits removal of rattling engagement between the male and female tube members due to error in their tooth profiles, etc. in a simple manner without recourse to any arrangement to impose a load such as use of an urging force of a spring.

What is claimed is:

1. A helicoid mechanism comprising:
    male and female helically threaded tubes; a plurality of stowing parts such as recesses or openings formed in the outer circumference of said male tube; block pieces provided with helically threaded parts for threaded engagement with said female tube and inserted in said stowing parts respectively; and a tooth profile of the threaded portion of said male tube being shorter than that of the threaded parts of said block pieces.

2. A helicoid mechanism according to claim 1, wherein said male and female tubes are made of a plastic material containing glass fiber; while said block pieces are made of a plastic material not containing glass fiber.

3. A helicoid mechanism according to claim 2, wherein said male and female tubes are made of a polycarbonate resin material containing glass fiber; and said block pieces are made of a poly-acetal resin material containing molybdenum disulfide.

4. A helicoid mechanism comprising:
    male and female helically threaded tubes; a plurality of stowing parts such as recesses or openings formed in the outer circumference of said male tube; block pieces provided with helically threaded parts for threaded engagement with said female tube and inserted in said stowing parts respectively; said block pieces and said stowing parts having said block pieces turnable for adjustment so as to eliminate rattling or play of the threaded engagement between said female tube and said block pieces by the turning movement of said block pieces.

* * * * *